March 28, 1933.  W. SCHABELITZ  1,902,896
DEVICE FOR THE ELECTROTHERMIC TREATMENT OF METALS
Filed Feb. 27, 1931
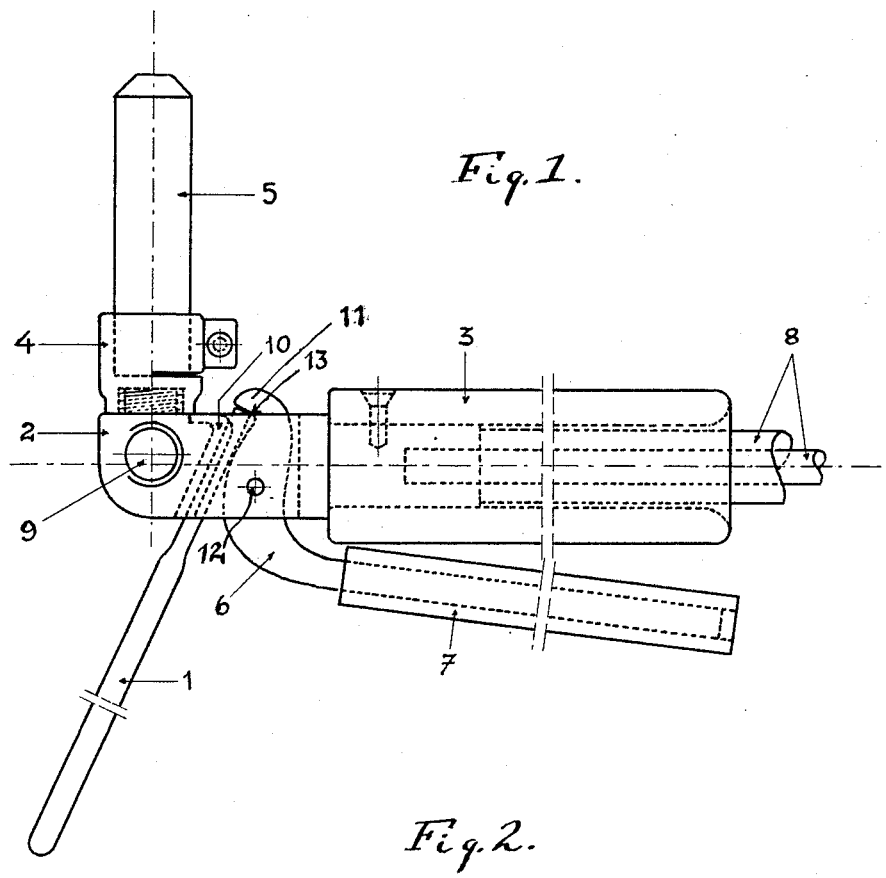
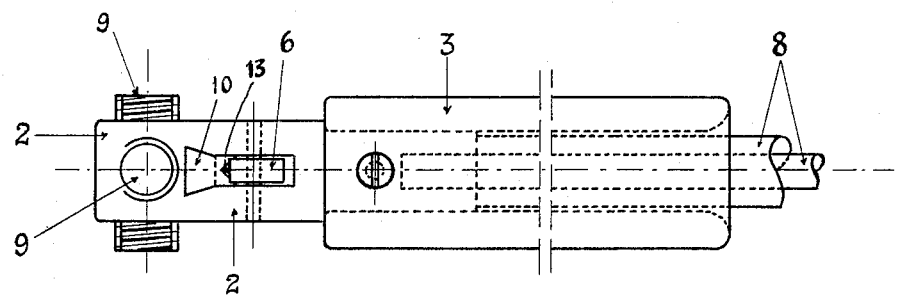
Inventor:
William Schabelitz,
by Calver & Calver,
Attys.

Patented Mar. 28, 1933

1,902,896

UNITED STATES PATENT OFFICE

WILLIAM SCHABELITZ, OF LUCERNE, SWITZERLAND

DEVICE FOR THE ELECTROTHERMIC TREATMENT OF METALS

Application filed February 27, 1931, Serial No. 518,875, and in Switzerland February 28, 1930.

This invention relates to a device for the electro-thermic treatment of metals.

It is known in connection with the electro-thermic treatment of metals to preheat the part to be treated, for example the junction point where two metals are to be united by welding or hard soldering by means of a gas flame or by means of the electric arc before subjecting said part to the action of an electrode whereby the treatment is completed. With the electric arc temperatures may be attained of 3000 to 4000° C., but over a very restricted area, so that there is liability to burning of the metal at this point; further, such high temperatures are not admissible for the welding of copper, so that the methods heretofore known are unsuitable for example for welding copper rail bonds to the rails of electrical railways.

According to the present invention the electrical preheating is effected not by means of the electric arc but by resistance heating, that is by direct contact of a preheating electrode with the metal to be welded. Thereby there is obtained more uniform preheating distributed over a larger area than is possible when preheating by means of the electric arc, so that the present method can be advantageously applied for welding copper rail bonds for example for bridging the abutting ends of electrical railway rails.

For performance of the methods heretofore known it was proposed to employ, for example, a device incorporating a tubular holder through which was led a separate conducting wire to each of the electrodes carried by a separate arm of said holder. This mode of leading current to the electrodes is, however, not applicable for performance of the present method because in the present case there is necessarily a lower voltage with a considerably higher amperage, involving a greater cross sectional area of the conductors. Accordingly, in the device according to the present invention a head piece on the holder carrying the electrodes forms a conducting connection between the cable for the supply of current and the electrodes.

Preferably there are provided on this head piece three sockets selectively engageable by the preheating electrode, the said sockets being constructed as screw threaded sockets disposed radially of the axis of the holder and angularly spaced apart to the extent of 90°, the axes of two of said sockets being aligned. This head piece also presents in a plane disposed perpendicularly to the line of said axes an opening for passage of the welding electrode into which opening projects a clamping jaw formed on a hand lever pivoted to the holder, by which jaw the welding electrode can be clamped. As according to this construction of the head piece the preheating and welding electrodes may be disposed at right angles to one another, the change over of the holder from preheating position to welding position can be effected by hand by a slight turning movement of the wrist whether the operator holds the device in his right hand or in his left hand. The welding electrode can be secured by a simple clamping operation by operation of the hand lever fitted to the holder within reach of the operator's hand in manner permitting simple and rapid exchange of said electrode.

The opening in the head piece for passage of the welding electrode is provided with a lining of soft metal so as to protect the head piece against burning or other damage especially at the point where the welding electrode enters the head piece.

In the accompanying drawing there is illustrated by way of example a device embodying the invention adapted for welding or hard soldering.

Fig. 1 is a side elevation and Fig. 2 a plan of the said device.

Referring to the drawing, a holder provided with an electrically insulated handle 3 of rubber or compressed paper carries at one end a metallic head piece 2 formed with an opening or slot 13 into which is inserted one end of the fusible welding electrode 1 and which head piece is provided with three sockets 9 disposed in two planes perpendicular to the axis of the holder, said sockets being each adapted for attachment of a clamp 4 for the non-metallic preheating electrode 5, for example a carbon electrode. Pivoted to the head piece 2 by means of a pin 12 is a lever 6 electrically insulated by means of a rubber tube 7 or otherwise, which lever is provided with a camsurfaced clamping jaw 11 projecting into the opening 13 for the welding electrode and serving to clamp said welding electrode to the head piece. It will be obvious that the welding electrode 1 will be clamped to the head 2 by a downward movement of the lever 6, and that the said welding electrode will be released by an upward movement of said lever, the finger at the end thereof, against which said electrode may abut, forcing said electrode out of said head if it should stick in the opening 13. The opening 13 for the welding electrode is located in a plane perpendicular to the aligned axes of the oppositely arranged sockets 9. The electric current is supplied to the electrodes 1 and 5 by a cable 8 penetrating the handle 3, the end of which cable is connected with the head piece 2 for example by welding.

The opening 13 for passage of the welding electrode 1 is provided with an exchangeable lining 10 of soft metal, for example of copper, which lining is opposed to the clamping jaw 11 and serves to protect the head piece 2 from injury, especially by burning, which is liable to happen at the point where the welding electrode 1 enters the head piece 2.

After preheating by mere contact or stroking over with the preheating electrode 5 the metals to be welded or hard soldered together, the device is rocked through an angle and the free end of the welding electrode 1 applied to the preheated point, whereupon the welding or soldering operation can be effected.

The provision of three sockets 9 to any one of which may be attached the clamp 4 for the preheating electrode 5 facilitates the manipulation of the device. If the clamp 4 is fitted to one of the two diametrally opposed sockets 9, then in the use of the welding electrode 1, after preheating by means of the electrode 5, the operator need only rock the holder to the right or to the left through an angle of 90° depending on the position of the operator in relation to the working station and depending on whether the operator is right-handed or left-handed. A protecting cap of insulating material is preferably applied to each of the two sockets 9 which is temporarily out of use.

As a further example of the use of the described method and of the device for performance thereof there may be mentioned the application of a metal coating to a metal article, for example the application of copper to copper for the purpose of thickening worn parts of machines, conductors, etc. In the last mentioned case the material of the welding electrode furnishes weld material to be applied to the metal to be treated.

What I claim is:—

An electrical soldering or welding device comprising an insulated handle having a head provided with sockets at a right angle to each other, said sockets being each constructed to hold a preheating electrode, said head being also constructed with an opening for holding a welding electrode, and means for clamping said electrodes to said head, said clamping means for the preheating electrode consisting of a clamping sleeve fitting either of said sockets, and said clamping means for the welding electrode consisting of a cam lever.

In testimony whereof I have signed my name to this specification.

WILLIAM SCHABELITZ.